United States Patent [19]

Taylor

[11] 3,798,560

[45] Mar. 19, 1974

[54] ADAPTIVE TRANSVERSAL EQUALIZER USING A TIME-MULTIPLEXED SECOND-ORDER DIGITAL FILTER

[75] Inventor: Michael Gordon Taylor, Holmdel, N.J.

[73] Assignee: Bell Telephone Laboratories, Incorporated, Murray Hill, N.J.

[22] Filed: Jan. 29, 1973

[21] Appl. No.: 327,622

[52] U.S. Cl. .................... 328/167, 235/152, 333/18

[51] Int. Cl. ........................................ H03h 7/14

[58] Field of Search ........ 333/18, 28 R; 328/42, 65, 328/167; 235/152, 181

[56] References Cited

UNITED STATES PATENTS

| | | | |
|---|---|---|---|
| 3,639,848 | 2/1972 | Elliott | 328/167 |
| 3,706,076 | 12/1972 | Schuster | 333/18 X |
| 3,737,636 | 6/1973 | Esterban | 328/167 X |

*Primary Examiner*—Paul L. Gensler
*Attorney, Agent, or Firm*—J. P. Kearns

[57] ABSTRACT

A second-order digital filter arrangement having output taps from each of two first-order subsections and a pair of adjustable gain devices connected at each tap is modified by providing reentrant connections around the entire filter and also its first-order subsections to perform the function of a nonrecursive multitap transversal equalizer. One of each pair of gain devices serves as a forward-feeding tap signal multiplier. The remaining one of each pair of gain devices serves as a correlator for tap and error signals to adjust the gain of a tap signal multiplier. Memories for storing output signals and updated tap gain coefficients are programmed on a time-division basis while message signals are being circulated through the digital filter subsections. The capability of reconversion to the recursive digital-filter form under program control is at all times preserved.

7 Claims, 5 Drawing Figures

ADAPTIVE TRANSVERSAL EQUALIZER USING A TIME-MULTIPLEXED SECOND-ORDER DIGITAL FILTER

FIELD OF THE INVENTION

This invention relates generally to digital electric-wave filters and more specifically to the adaptation of a second-order digital filter to serve as an automatic transversal equalizer.

BACKGROUND OF THE INVENTION

In a paper by L. B. Jackson, J. F. Kaiser and H. S. McDonald published in the September 1968 issue of IEEE Transactions on Audio and Electroacoustics (Vol. AU-16, No. 3) and entitled "An Approach to the Implementation of Digital Filters" the general characteristics of digital filters are outlined and the principlal canonical forms are described. Digital filters accomplish the frequency shaping of continuous waveforms by operating on discrete signal samples of these waveforms with digital components, such as adders, subtractors, multipliers and shift registers. Digital filters avoid the use of reactive circuit components and piezoelectric crystals which must generally be tailored to the specific circuit application under conventional analog design techniques. Digital filters are adaptable to the building block concept. The increasing availability of integrated circuits makes digital filters more attractive from the standpoints of cost, size and reliability than conventional analog filters in many applications.

The basic direct-form digital filter comprises a plurality of delay units readily implemented by shift registers connected in series, input and output combining circuits, and a plurality of multipliers placed in feedback and feedforward relationships between evenly spaced taps at the delay units and the respective input and output combining circuits. For compatibility with continuous analog circuits the digital filter is preceded and followed by respective analog-to-digital and digital-to-analog converters. The number of stages in each shift-register delay unit is determined by the number of serial bits in each word encoding an analog input sample. The total number of delay units is determined by the order of the algebraic equation (a ratio of polynomials) defining the filter transfer function desired to be implemented. The delay amount provided by each delay unit is typically the symbol interval of the data being processed.

As explained by Jackson et al, the ratio of polynomials of arbitrary order defining a direct-form digital filter can be transformed into continuing products of second-order polynomial quotients. The hardware required to implement this cascade form of the digital filter becomes simplified into a sequence of second-order building blocks. In this cascade form of the digital filter each second-order stage compreises two delay units and two pairs of feedforward and feedback multipliers whose operating coefficients are the only variables from stage to stage. Such a cascade of identical delay units can be implemented with a single second-order section whose feedforward and feedback coefficients are time multiplexed to form a read-only memory while the samples being operated on are recirculated from output to input until all coefficients have been applied to each sequential sample.

The time-multiplexing principle for operation of a cascade-form digital filter using only one second-order section cannot readily be applied to the nonrecursive transversal equalizer function because complete processing of each sample of the input signal cannot be accomplished within a single sampling interval. In addition, processing is often required on a per symbol basis rather than on a per sample basis. Furthermore, the coefficients applied to the several selected signal samples are a function of an error signal determined from a summation of a plurality of products of prior signal samples and a plurality of independently variable tap-gain coefficients.

SUMMARY OF THE INVENTION

It is accordingly an object of this invention to realize a nonrecursive transversal equalizer for a synchronous digital data transmission system from a single time-multiplexed second-order digital filter section.

It is another object of this invention to realize both nonrecursive and recursive filters compatibly from a common single second-order digital filter section.

It is still another object of this invention to realize an adaptive transversal equalizer interchangeably with an *n*th order recursive digital filter from a single time-multiplexed second-order digital filter.

In accordance with this invention these and other objects are achieved by modifying a second-order digital filter to permit recirculating digital signals internally around the individual delay units therein as well as around two such delay units in tandem, to permit recirculating combined feedforward tap signals and obtain a cumulative sum extending over a plurality of sampling intervals, to incorporate an error detection circuit to operate on cumulative tap-signal sums and to convert the normal feedback multipliers into tap incrementation control devices. With the removal of the feedback multipliers from the normal input combining circuit of the digital filter and the addition of circuitry to permit both internal and external recirculation of digital signals, the network becomes nonrecursive and capable of realizing the multitap transversal equalizer.

The purpose for internally circulating signal samples around individual delay units is to restrict operation to once during each symbol interval where more than one sample of a signal wave is taken during each symbol interval. The purpose for externally circulating signal samples around pairs of delay units is to simulate a multitap direct-form delay system.

A feature of this invention is the compatibility of hardware with both recursive and nonrecursive digital filter forms so that a straightforward change in control words effects the transformation between forms.

Another feature of the invention is that the stored coefficients for feedforward multiplication are made adaptive to minimizing the error component of the accumulated outputs of the second-order section when it is used to realize a nonrecursive filter.

DESCRIPTION OF THE DRAWING

A more complete understanding and appreciation of this invention will be attained from a consideration of the following detailed description and the drawing in which.

DETAILED DESCRIPTION

Figure 1:
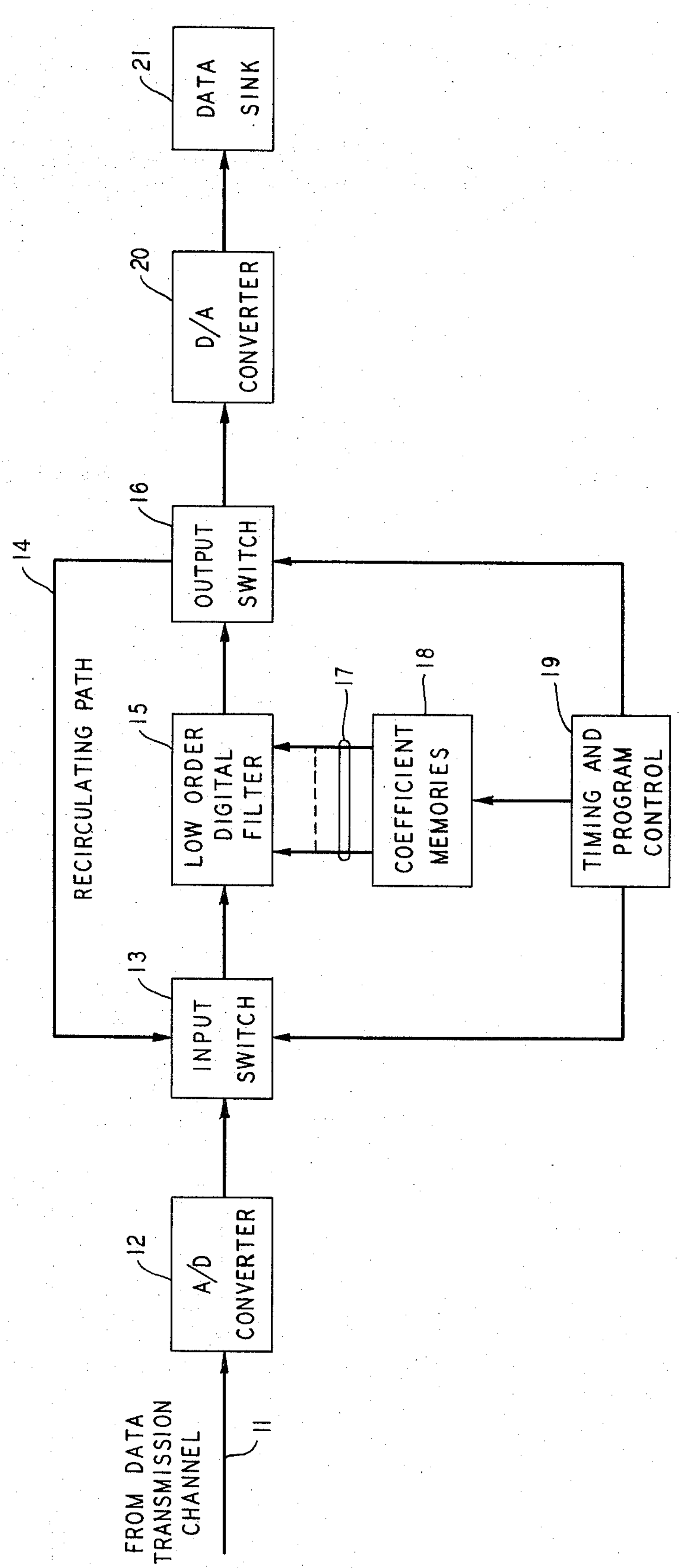
FIG. 1 PRIOR ART
FIG. 1 is a block diagram of a recursive time-division multiplexed digital filter known to the prior art.

A receiver for a digital data transmission system employing a time-multiplexed digital filter of low-order is illustratd in FIG. 1. The prototype for this arrangement is found in FIG. 4 of U.S. Pat. No. 3,522,546 issued on Aug. 4, 1970 to L. B. Jackson and H. S. McDonald. A data signal wave received from a data transmission channel on input line 11 is first converted to multibit digital word form in analog-to-digital converter 12 at a sampling rate much higher than the highest frequency present in the channel signal, e.g., 9,600 samples per second to yield four samples per symbol of a 2,400-bit-per-second data wave. Each sample taken is converted into a multidigital word of 12 bits, for example. Once the sample traverses input switch 13, it is entered in the first shift register storage subsection of digital filter 15. Assuming filter 15 is of second-order, two shift registers are provided in tandem and each register includes a large number of stages or time slots of the order of 40 or 50. Thus, for each data sample taken a large number of different operations, such as filtering, demodulation, demultiplexing and equalization, can be performed in successive time slots. Output switch 16 permits the samples to be recirculated by way of path 14 through filter 15 during the successive time slots. The final output of filter 15 is applied by way of output switch 16 to digital-to-analog converter 20 and data sink 21.

The array of coefficients to be applied over leads 17 to filter 15 according to a predetermined program during the several time slots is stored in memory 18. Timing and program control 19 controls the sampling rates at converters 12 and 20, the openings and closings of switches 13 and 16, and the transfer of the correct coefficients to filter 15. It is within the skill of the art to devise programs for handling different types of data signals, such as baseband and passband amplitude modulated signals as well as frequency-modulated and phase-modulated signals.

A digital filter realizes a transfer function of the form $$H(z)=\frac{\sum_{i=0}^{n} a_i z^{-i}}{1-\sum_{i=1}^{n} b_i z^{-i}}=\frac{N(z^{-1})}{D(z^{-1})}, \qquad (1)$$

there $z^{-1}$= the $z$ - transform difference operator corresponding to a delay of one sampling period, $i$ = index relating coefficients to delay elements, $n$ = order of the filter (this is constrained to be less than or equal to twice the maximum number of time slots per sampling period), $a_i$ = feedforward gain coefficient for the $i$th delay element, $b_i$ = feedback gain coefficient for the $i$th delay element, $N$ = numerator, and $D$ = denominator.

Figure 2:
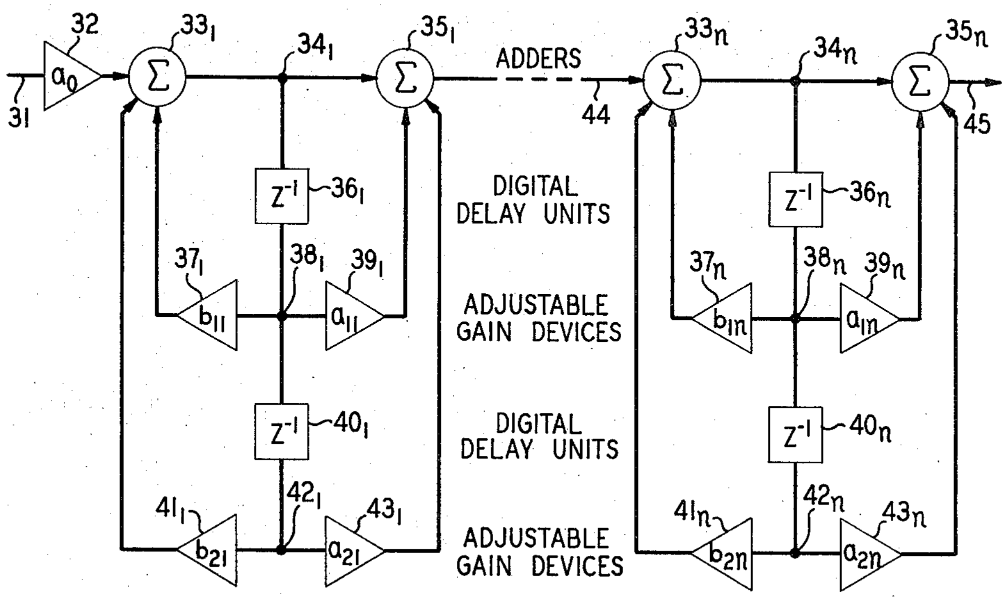
FIG. 2 PRIOR ART
FIG. 2 is a block diagram of the cascade form of the recursive digital filter known to the prior art.

Equation (1) defines the direct form of the digital filter as illustrated, for example, in FIG. 2 of the cited Jackson et al patent. If at least one $b_i$ coefficient is nonzero, the filter is said to be recursive, i.e., previous outputs are combined with present inputs. If all $b_i$ coefficients are zero, the filter is said to be nonrecursive, i.e., only previous inputs are used to form new outputs and no previous outputs are so used.

Although the direct form of the digital filter has the capability of realizing either recursive or nonrecursive transfer functions, it is not generally used to realize the recursive function because the latter function is sensitive to small changes in the location of the poles, i.e., frequencies at which the denominator of equation (1) goes to zero. The pole locations are thus sensitive to small changes in the $b_i$ coefficients. Accordingly, the $b_i$ coefficients must be precisely determined in the direct-form digital filter.

Equation (1) can be factored by using standard techniques into a continued product of second-order rational functions, namely, $$H(z^{-1})=a_0\prod_{i=1}^{m}\frac{1+a_{1i}z^{-1}+a_{2i}z^{-2}}{1-b_{1i}z^{-1}-b_{2i}z^{-2}}, \qquad (2)$$

where $m$ = the maximum number of time slots per sampling period.

Equation (2) can be realized as a cascade of second-order digital filter sections as shown in FIG. 2. Each second-order section, comprising a tandem connection of two delay units 36 and 40 separated by a tap 38 and having an input tap 34 and an output tap 42, an input adder 33, an output adder 35, adjustable feedback gain devices 37 and 41 and adjustable feedforward gain devices 39 and 43, realizes one pair of zeros and one pair of poles in the overall transfer function. Input gain device 32 connected between input line 31 and input adder $33_1$ realizes the scale factor $a_0$ in equation (2). The left-hand second-order section uses subscripts 1, while the right-hand section uses the subscript $n$. Broken line 44 suggests the presence of as many additional second-order sections as are required to realize a given transfer function. Inasmuch as each section is physically the same and differs functionally from any other only in the $a_i$ and $b_i$ gain coefficients, a single section can be time multiplexed by looping output to input and changing the coefficients on each recirculation until a given program is implemented. For each recirculation a set of four gain coefficients plus a control word are stored. The control word effectively directs the signal flow through the second-order section.

A control word can illustratively include on the order of twelve bits with certain bits dedicated to magnitude scaling by powers of two, to multiplexing, i.e., whether a new input is to be accepted or the old output recirculated, and to storing an output for later reuse.

The adaptive transversal equalizer is an important example of a nonrecursive transfer function employed in high-speed digital data systems which is not susceptible of realization in a straightforward manner as a cascade of second-order digital filter sections. The reason for this is that the gain coefficients applied at each tap are adaptive to an error signal which can only be determined from the summation of the products of a plurality of simultaneously available tap signals each of which in turn is multipled by a different gain coefficient.

Figure 3:
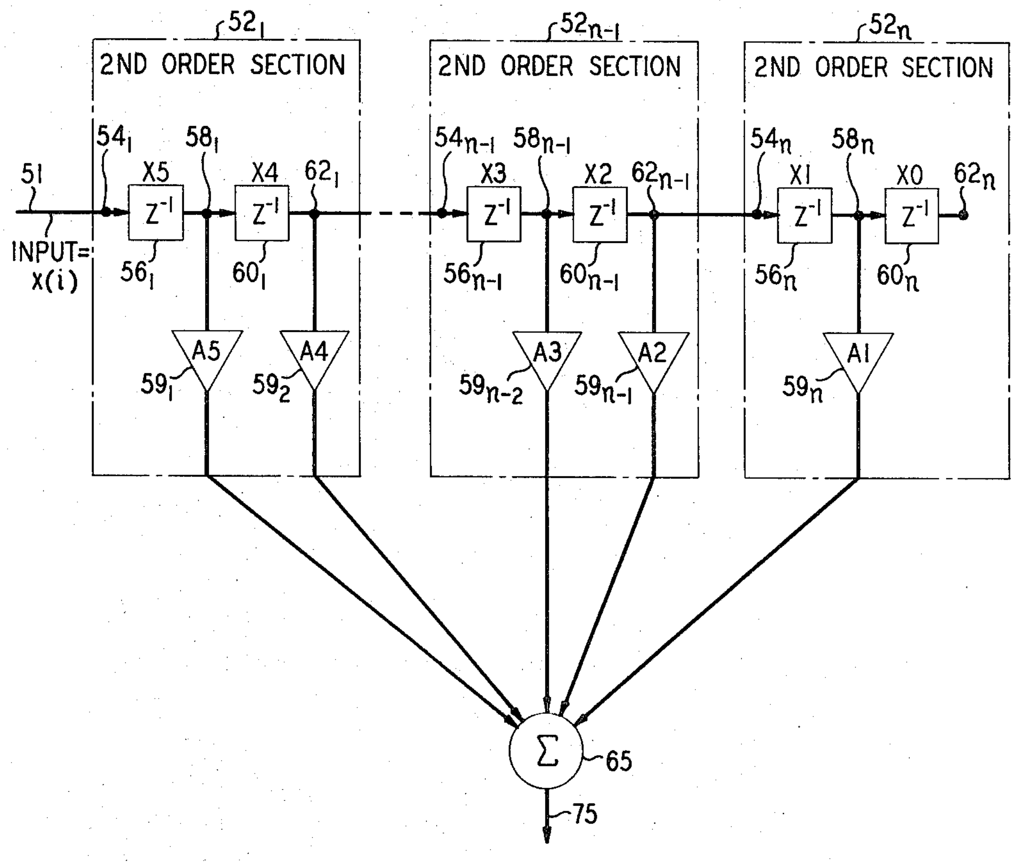
FIG. 3 is a block diagram of a nonrecursive digital filter realizable from two-tap second-order digital sections.

FIG. 3 illustrates the generalized nonrecursive form of the digital filter with the delay units compartmentalized into pairs. It will be observed that there are no feedback gain devices. Each broken-line box 52 encompasses two delay units 56 and 60, input taps 54, intermediate taps 58, output taps 62, and an adjustable gain device 59 at each intermediate and output tap. The overall input is applied at lead 51 and the overall output is obtained as the combination of all the signals operated on by gain devices 59 on lead 75 at the output of summation circuit 65. Similar elements in the several blocks have the same basic designator, but are distinguished by the subscripts. The subscripts $n$ and $n-1$ suggest that there may be an indefinite number of these blocks in a practical system. The coefficients for gain devices 59 are indicated in the drawing as A1 through A5. Final block $52_n$ has no functioning output tap and delay unit $60_n$ is shown for symmetry only.

The operation of the arrangement of FIG. 3 as a nonrecursive digital filter can be understood if it is regarded for purposes of discussion as a five-tap structure in which each block is occupied by signals obtained from five consecutive samples available at the time $i$ when input $x(i)$ is received on input lead 51. At this time sample X1 is available in delay unit $56_n$; sample X2, in unit $60_{-1}$; and so forth. In second-order section $52_n$ the single product X1 times A1 is obtained and applied to adder 65. In second-order section $52(n-1)$ the two products A2X2 and A3X3 are obtained and applied to adder 65. In second-order section $52_1$ the two products A4X4 and A5X5 are similarly obtained and also applied to adder 65. The resultant is an $n$-bit number representing the application of the desired transfer function to the digitally encoded input at one particular sampling time.

Immediately after the above-described products are taken all values stored in delay units 56 and 60 are shifted one sample time to the right so that input $x(i) = X6$ is stored in unit $56_1$; sample X5 in unit $60_1$; sample X4 in unit $56(n-1)$; and so forth. A new input $x(i+1) = X7$ can now be present on input lead 51. The same gain coefficients A1 through A5 are applied to the shifted samples to form the products A1X2, A2X3, A3X4, A4X5 and A5X6. The sum of these products, taken in adder 65, provides a second $n$-bit number defining the filtered signal at a second sampling time.

The multiplications, additions and shifts described above are repeated until all input samples have been operated on. The continuing output can be converted to analog form in a straightforward manner. The above operations can be performed by applying consecutive inputs to a single second-order section and processing these inputs in groups having as many elements as there are delay units in the direct-form digital filter being simulated and at a speed which permits the operation of all gain coefficients on each element within a signal sampling interval. Because of the speeded-up processing input buffer storage is required for each group. A new group of input samples is formed for each sampling interval by discarding the oldest element of the prior group and adding one new element from the input buffer store. A recirculation path between output and input of the second-order section can include storage for the old elements of the prior group which are to be part of the new group. Selectively controlled input and output switches determine which elements of each group are discarded, recirculated or augmented from the input. For the five-tap direct-form filter three stages each of input storage and recirculation storage appear to be required. A processing speed three times greater than that required in a nonmultiplexed system suffices to shift into and out of the second-order section the first group element alone and form the first single product in one time slot; the next two elements and form a pair of products in one more time slot; and the last two elements and form the final pair of products in a final time slot. The summation of all three products constitutes the solution of the transfer equation for one sampling interval.

The above operation can be summarized for an assumed input sequence X1, X2, X3, . . . , and coefficient sequence A1, A2, A3, A4, and A5 in Table I.

TABLE I

| Sampling period | Time slot | Gain Coef. 1st | Gain Coef. 2nd | Sample 1st | Sample 2nd | Output |
|---|---|---|---|---|---|---|
| 1 | 1 | A1 | | X1 | | A1X1 |
| 1 | 2 | A3 | A2 | X3 | X2 | A2X2+A3X3 |
| 1 | 3 | A5 | A4 | X5 | X4 | A4X4+A5X5 |
| 2 | 1 | A1 | | X2 | | A1X2 |
| 2 | 2 | A3 | A2 | X4 | X3 | A2X3+A3X4 |
| 2 | 3 | A5 | A4 | X6 | X5 | A4X5+A5X6 |
| 3 | 1 | A1 | | X3 | | A1X3 |

It is apparent from TABLE I that each sampling period is divided into three time slots. The designations "first" and "second" applied to gain coefficients and samples refer to the respective intermediate and output taps of a second-order section. In the first time slot of the sampling period a signal sample is operated on by the first coefficient to form the product A1X1 and corresponds to that of block $52_n$ in FIG. 3. The second time slot covers the operation on two intermediate samples of a group of two further coefficients to form the products A2X2 and A3X3 and corresponds to that of block $52_{-1}$ in FIG. 3. Finally in the last time slot of a sampling period the fourth and fifth samples of a group are operated on by the last two coefficients to form the products A4X4 and A5X5. These operations correspond to those effected in block $52_1$ of FIG. 3. These same operations are repeated in subsequent sampling periods as indicated in the remainder of TABLE I. The last column of the table lists the sample-coefficient products obtained in the several time slots. The combination of the three sets of products yields the transformed input signal sample for that interval.

A similar operating program can be devised for implementing a transfer function of an arbitrary order.

The problem of implementing an adaptive transversal filter with a single time-multiplexed second-order digital section is considerably more complex than the simple direct-form nonrecursive transfer function in which the gain coefficients can be determined in advance. In the adaptive equalizer the gain coefficients depend on changing channel transmission characteristics which can only be determined after many consecutive impulse response samples have been observed. The possibility of feeding the output of the rightmost tap of a second-order section to the leftmost tap has already been discussed in connection with FIG. 3. There is a further requirement in the transversal equalizer that operations performed in both consecutive and non consecutive sampling periods, and not merely those performed in time slots within the same sampling period, be accumulated and made available for operations in subsequent sampling periods. Moreover, provision must be made for recirculating delayed signals over a plurality of sampling periods.

Figure 4:
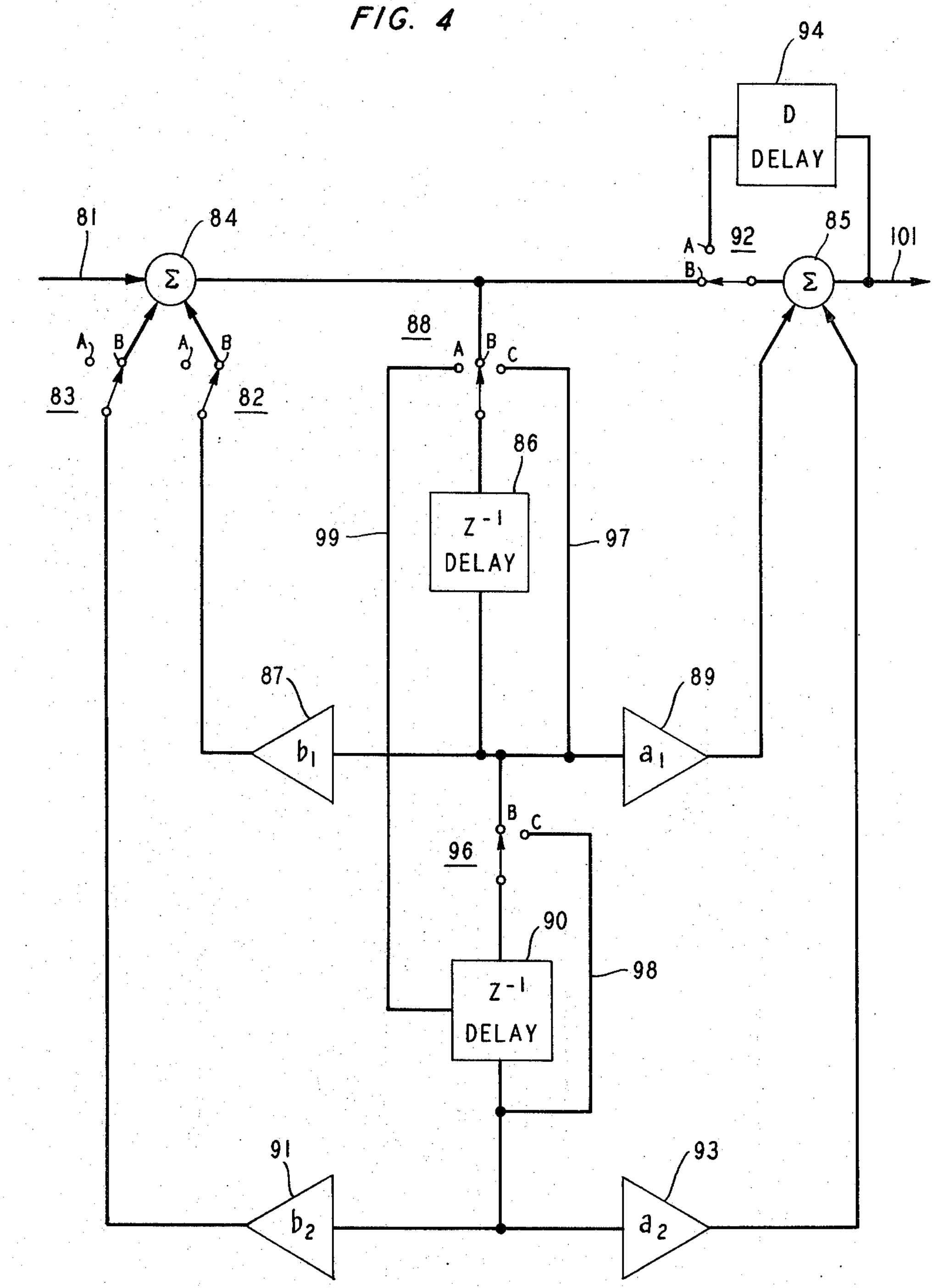
FIG. 4 is a simplified block diagram showing a second-order digital filter section capable of arrangement in either the recursive cascade form or the nonrecursive direct form according to this invention.

FIG. 4 is a simplified block diagram illustrating certain modifications according to this invention in a second-order digital section to implement a multitap transversal equalizer, while preserving the capability of realizing a recursive transfer function. The structure of FIG. 4 comprises input adder 84, output adder 85, delay units 86 and 90, feedforward gain devices 89 and 93, feedback gain devices 87 and 91, single-pole switches 82 and 83 single-pole triple-throw switch 88, single-pole double-throw switches 92 and 96 and auxiliary delay unit 94. Input signals are accepted on lead 81 and final outputs appear on lead 101.

The recursive form of the digital filter is realized when switches 82, 83, 88, 92 and 96 in FIG. 4 are in the B position. In this condition gain devices 89 and 93 act as feedforward elements and devices 87 and 91, as feedback elements. Recirculation is accomplished externally by means not shown but within the principles discussed in connection with FIG. 1.

The nonrecursive form of the filter is realized when single-pole switches 82, 83 and 92 are in the A position. Switch 88 is movable to either the A, B or C position as required and switch 96 is movable to either B or C position as required. The operation of switches 82 and 83 to positions A removes gain devices 87 and 91 and adder 84 from the circuit. The operation of switch 88 to position A provides an internal recirculation path through conductor 99 independent of output accumulator 85 to transfer unmodified signal samples from the output tap of one two-tap section to the input tap of another in effecting a multitap equalizer. The operation of switches 88 and 96 to the C position provides for recirculation through conductors 97 and 98 of unmodified signal samples around the individual delay units to preserve their contents over a plurality of sampling intervals where nonrecursive filter processing is performed at the rate of only one sample per symbol. The operation of switch 92 to the A position provides the capability of accumulating the sum of the outputs of a plurality of feedforward gain devices over an extended period. Switch 92 is moved to the A position selectively whenever it is necessary to augment the sum accumulated in adder 85. The overall operation of the nonrecursive form of the digital filter is apparent from the previous discussion of FIG. 3.

Although the several switches are shown on FIG. 4 in mechanical analog form, they are susceptible of implementation in any suitable form including the use of semiconductors. The position of these switches is preferably under program control, thus allowing the second-order filter section to realize both fixed recursive cascade-form filters and adaptive nonrecursive filters.

The operations associated with one recursive second-order digital filter section include four multiplications, only two of which are required for the direct form of a nonrecursive filter. The two unused multiplications can be turned to account in implementing an adaptive nonrecursive filter by using them as error signal correlations. This change can be accomplished by means of the control word bit which effects the transformation between recursive and nonrecursive formats.

A frequently implemented adaptive tap-updating algorithm for transversal equalizers is embodied in the following equation:

$$a_j(i+1) = a_j(i) - kx(i-j)\cdot e(i) \quad (3)$$

where $a_j$ = gain coefficient applied to the $j$th equalizer tap, $i$ = time index, $j$ = tap index, $k$ = incrementation factor, $x$ = input signal sample value, and $e$ = error difference between the actual filter output and the desired output — a quantized value for example.

Equation (3) states that the next gain coefficient value $a_j(i+1)$ is the present value $a_j(i)$ decremented by the product of the $i$th input sample delayed to the $j$th tap location and the present error amount $e(i)$. The incrementation factor $k$ is realized as a power of two and in a binary shift register is effected by shifting the contents the appropriate number of stages left or right depending on whether $k$ is lesser or greater than one.

Figure 5:
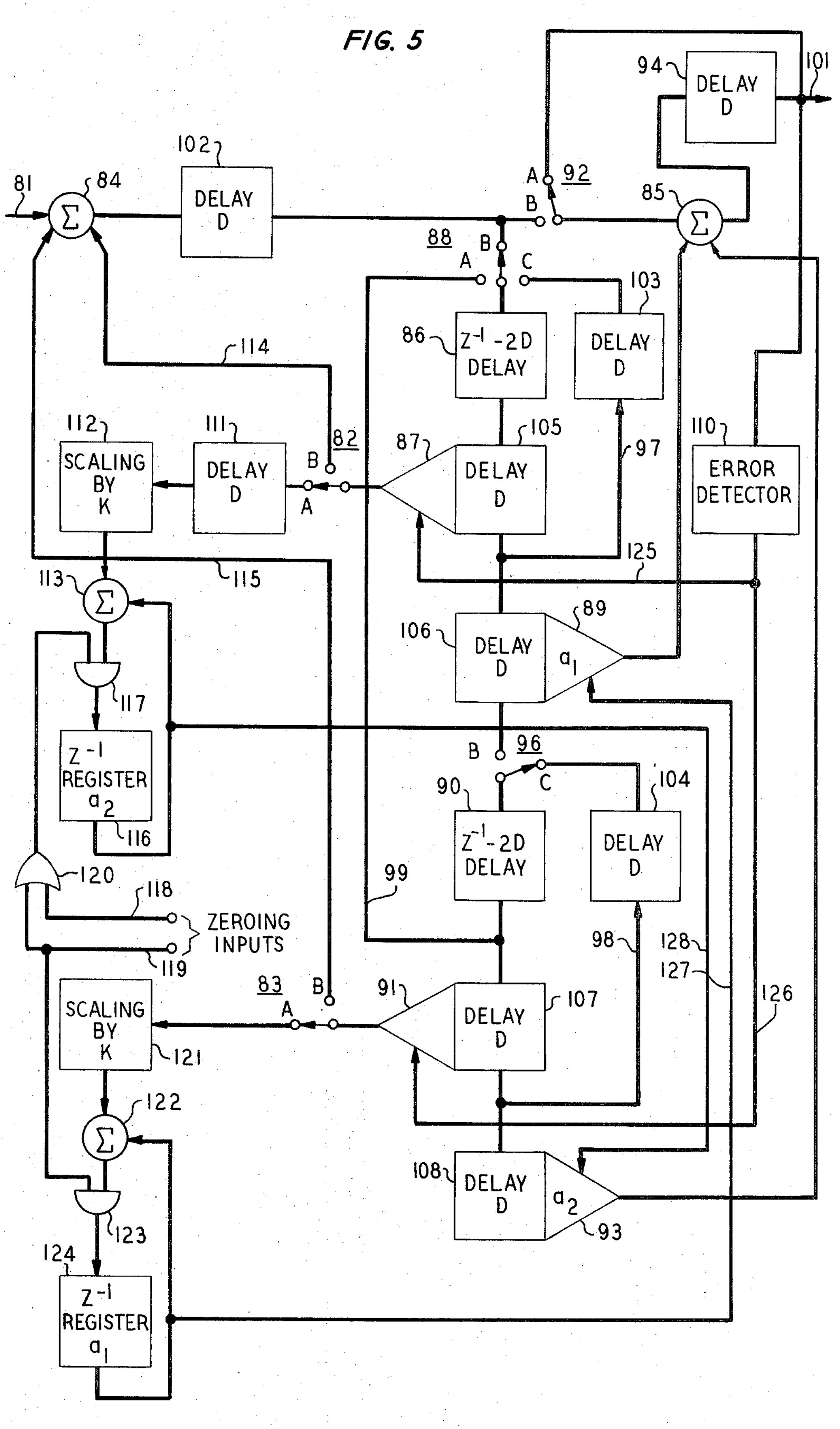
FIG. 5 is a block diagram showing the modifications according to this invention for converting a time-multiplexed second-order digital filter into an adaptive nonrecursive, direct-form transversal equalizer.

FIG. 5 shows an expansion of FIG. 4 to include the error detector and the conversion of the feedback gain devices to error correlation service. The elements that are common to FIGS. 4 and 5 carry the same designators. It is to be observed that the principal delay units are shortened by 2D amounts, where D is the width of a time slot, in order to allow time for processing and to avoid any race conditions. The auxiliary delay units 105 and 106 in series with the output of principal delay unit 86 and units 107 and 108 in series with the output of principal delay unit 90 are each of one time-slot duration to preserve the overall delay for each first-order component at $z^{-1}$ units. Further auxiliary delay units 102, 103, 104 and 111 are provided for similar purposes.

The principal differences between FIGS. 4 and 5 lie in the conversion of normal feedback gain devices 87 and 91 to correlation use by disconnecting their normal outputs on leads 114 and 115 through transferring switches 82 and 83 from B to A positions and thus connecting these outputs instead to storage registers 116 and 124.

The overall output of the second-order section while in the nonrecursive equalizer mode is connected at output lead 101 to an error detector 110, which operates on accumulated outputs to take the difference between the actual output and an allowed quantized digital signal level and to deliver a binary error output by way of leads 125 and 126 to further inputs of gain devices 87 and 91. Each such polarized error output is correlated with the signal temporarily stored in auxiliary delay unit 105 or 107 to determine an increment for the tap gain coefficient of the corresponding feedforward gain device 89 or 93.

The incrementation signal from gain device 87 is applied by way of auxiliary delay device 111 to scaling device 112, an attenuator whose setting controls the size of the incrementation step effective on the tap gain device 93. Because of the dynamic nature of the continual shifting process the gain coefficients are not calculated and stored in register 116 until after the circulating signal from which it was derived has been shifted into principal delay unit 90. Accordingly, the register 116 stores gain coefficients $a_2$ to be applied to forward tap gain device 93 over conductor 128 as shown in FIG. 5. For the same general reason of timing coordination auxiliary delay unit 111 is required between the output of gain device 87 and scaling unit 112.

In a similar fashion the incrementation signal from gain device 91 is applied to scaling device 121, whose setting controls the magnitude of the incrementation step effective on gain device 89. Register 124 accumulates the tap gain coefficient values $a_1$ to be effective on forward tap gain device 89, because the circulating signal from which these values were derived has now been shifted into principlal delay unit 86. Tap gain coefficients $a_1$ are applied to forward tap gain device 89 over conductor 127 as shown in FIG. 5.

Registers 116 and 124 store as many gain-coefficient words as there are taps in the equivalent direct-form equalizer. Registers 116 and 124 are indicated as having a delay of $z^{-1}$ units to correspond with the effective lengths of principal delay units 86 and 90. If there are fewer equalizer taps than stages in registers 116 or 124, the surplus stages are unused for equalizer purposes, but serve to keep the occupied stages in the proper time relationship with the delay units. The contents of registers 116 and 124 are continuously recirculating through adders 113 or 122, by means of which any incrementation of the contents during a particular time slot is effected from the output of gain device 87 or 91.

AND-gates 117 and 123 are placed in circuit with the recirculation loops in order to zero the stored coefficients initially from a signal source (not shown) connected to zeroing input 119. It is convenient to have one coefficient corresponding to a center reference tap initially set to a value of one. This is provided for in an additional input at lead 118 through OR-gate 120 to register 116 only. The center tap is typically an odd-numbered tap and occurs at the first tap of a second-order section.

The adaptively controlled gain levels of gain devices 89 and 93 are applied to output adder 85 whose contents are also recirculated through time-slot delay unit 94 when switch 92 is in the A position. As in FIG. 4 the A position of switch 88 provides for transfer of the contents of principal delay unit 90 to the delay unit 86 at the proper sampling instant. The B position of switches 88 and 96 provide for entry of new samples into the second-order section. The C position of switches 88 and 96 provide for recirculation of the contents of principal delay units 86 and 90 over one or more sampling intervals, particularly where there is more than one sampling interval in each symbol interval.

The overall operation of the second-order section of FIG. 5 is essentially that of a multitap adaptive transversal equalizer, as disclosed in U.S. Pat. No. Re 27,047 issued Feb. 2, 1971 to R. W. Lucky. On the assumption that 50 time slots of storage are available in each principal delay unit of a second-order filter, it is possible to realize an adaptive equalizer having as many as 99 taps. This number of taps is rarely necessary in voiceband data service. Typically, a suitable equalizer can be constructed using nine, 13, 17, 21 or 25 taps on a nonrecursive transversal structure. This means that only that not more than half this number of time slots need be assigned to equalizer realization and the remaining taps up to the assumed maximum of 50 can be assigned to recursive filtering or demodulation service. Time slots in the tap-gain coefficient registers are coordinated with the signal storage cells in the principal delay units according to well known time-division multiplex principles.

While this invention has been described in terms of a specific illustrative embodiment, its principles are to be understood by those skilled in the art to which it relates to be susceptible of a wide range of modification within the scope of the following claims.

What is claimed is:

1. A digital filter for producing an equalized output from a distorted input signal comprising
   - first and second delay storage units in tandem,
   - a first and second pair of adjustable gain devices respectively connected to each of said delay storage units,
   - an accumulating adder for combining signals operated on by one of each pair of said gain devices,
   - means for connecting the other of each pair of said gain devices to control said one of each pair of said gain devices,
   - an error detection circuit connected to said adder,
   - means for applying error signals from said error detection circuit to the others of each of said pairs of gain devices for correlation with the delayed input signal thereat,
   - first means for selectively looping the output of each said delay unit to its own input, and
   - second means for selectively looping the output of said second delay unit to the input of said first delay unit.

2. The digital filter defined in claim 1 in which each of said delay storage units is a multistage shift register having at least as many stages as there are bits in each digitally encoded sample of said input signal.

3. The digital filter defined in claim 1 further comprising
   - a recirculating storage register for tap-gain control signals to be applied to each of said first pair of gain devices, and
   - means of scaling said error signals used in determining the magnitude of incrementation of said storage register.

4. The digital filter defined in claim 1 in which a switchable recirculation loop is connected between output and input of said adder to permit augmentation of prior stored sums of tap-gain controlled signals with additional sums of tap-gain controlled signals.

5. The digital filter defined in claim 1 in combination with control means for predetermining which of said first and second looping means is operative at any given time.

6. A second-order digital filter including two delay storage units in tandem, first and second pairs of gain-control devices connected to said delay units and input and output adder circuits to each of which are normally connected one each of said first and second pairs of gain devices: further comprising a first selectable recirculation loop around said output adder, second and third selectable recirculation loops around each of said delay storage units, a fourth selectable recirculation loop around both of said delay storage units in tandem, an error detector connected to said output adder for determining from a comparison with a quantized level the direction of the output signal error, means for applying signals from said error detector to one gain device of each of said first and second pairs of gain devices for correlation with input signal samples stored in said delay units, storage registers for gain coefficients controlling the other of each of said first and second pairs of gain devices, and means for transferring the outputs of the ones of each of said first and second pairs of gain devices between said input adder circuit and said storage registers.

7. A digital filter section adapted to interchangeable connection as either a recursive filter or a nonrecursive adaptive equalizer comprising not fewer than first and second delay storage units in tandem, first and second pairs of adjustable gain devices connected to the outputs of each of said delay storage units, first and second adders respectively connectable to the input of said first delay storage unit only and to the outputs of all of said delay storage units, means for connecting one of each of said pairs of gain devices to said second adders, means for selectively connecting the other of each of said pairs of gain devices in the alternative to said first adder whereby said filter section is in recursive form or to the one of each of said pairs of gain devices as gain control means whereby said filter section is in nonrecursive equalizer form, an error detection circuit connected to said second adder, means for selectively applying error signals from said error detection circuit to the other of each of said pairs of gain devices for correlation with the delayed input signal thereat, first means for selectively looping the output of each delay storage unit to its own input during operation as an equalizer, second means for selectively looping the output of the last said delay storage unit to the input of said first delay storage unit during operation as an equalizer, and control means for determining the selective operation of said digital filter section in both recursive and nonrecursive forms.

* * * * *